(12) United States Patent
Burdeniuc (10) Patent No.: US 10,570,245 B2
(45) Date of Patent: Feb. 25, 2020

(54) POLYURETHANE CATALYSTS FROM SULFUR BASED SALTS

(71) Applicant: Evonik Operations GmbH, Essen (DE)

(72) Inventor: Juan Jesus Burdeniuc, Colmar, PA (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/097,734

(22) Filed: Apr. 13, 2016

(65) Prior Publication Data

US 2016/0229945 A1    Aug. 11, 2016

Related U.S. Application Data

(63) Continuation-in-part of application No. 14/881,544, filed on Oct. 13, 2015.

(60) Provisional application No. 62/063,109, filed on Oct. 13, 2014.

(51) Int. Cl.
| | | |
|---|---|---|
| C08G 18/48 | (2006.01) | |
| C08G 18/16 | (2006.01) | |
| C08G 18/76 | (2006.01) | |
| C08G 18/22 | (2006.01) | |
| C08G 18/18 | (2006.01) | |
| C08G 18/24 | (2006.01) | |
| C08G 18/63 | (2006.01) | |
| C08G 18/40 | (2006.01) | |
| C08G 18/42 | (2006.01) | |
| C08G 18/54 | (2006.01) | |
| C08L 67/00 | (2006.01) | |
| C08G 101/00 | (2006.01) | |
| B01J 31/02 | (2006.01) | |

(52) U.S. Cl.
CPC ....... *C08G 18/7621* (2013.01); *C08G 18/161* (2013.01); *C08G 18/163* (2013.01); *C08G 18/165* (2013.01); *C08G 18/166* (2013.01); *C08G 18/18* (2013.01); *C08G 18/1808* (2013.01); *C08G 18/1825* (2013.01); *C08G 18/1833* (2013.01); *C08G 18/1875* (2013.01); *C08G 18/225* (2013.01); *C08G 18/246* (2013.01); *C08G 18/4018* (2013.01); *C08G 18/4072* (2013.01); *C08G 18/42* (2013.01); *C08G 18/4208* (2013.01); *C08G 18/48* (2013.01); *C08G 18/4829* (2013.01); *C08G 18/546* (2013.01); *C08G 18/63* (2013.01); *C08G 18/633* (2013.01); *C08G 18/7664* (2013.01); *C08L 67/00* (2013.01); *B01J 31/0237* (2013.01); *B01J 31/0238* (2013.01); *B01J 31/0239* (2013.01); *C08G 2101/00* (2013.01); *C08G 2101/005* (2013.01); *C08G 2101/0008* (2013.01); *C08G 2101/0025* (2013.01)

(58) Field of Classification Search
CPC .... C08G 18/1875; C08G 18/48; C08G 18/16; C08G 18/7621; B01J 31/0215
See application file for complete search history.

(56) References Cited

U.S. PATENT DOCUMENTS

| | | | | |
|---|---|---|---|---|
| 3,053,778 | A * | 9/1962 | Toone | C08J 9/0066 521/120 |
| 4,394,491 | A | 6/1983 | Hoffman | |
| 4,757,105 | A | 7/1988 | Kopp et al. | |
| 5,902,835 | A * | 5/1999 | Meier | C08G 18/163 521/125 |
| 6,051,527 | A * | 4/2000 | Savoca | C08G 18/1825 502/167 |
| 8,367,870 | B2 | 2/2013 | Burdeniuc et al. | |
| 2007/0117902 | A1* | 5/2007 | Origuchi | C08F 283/00 524/457 |
| 2008/0281013 | A1 | 11/2008 | Nakamura et al. | |
| 2016/0102169 | A1 | 4/2016 | Burdeniuc | |

FOREIGN PATENT DOCUMENTS

| | | |
|---|---|---|
| CN | 101323701 A | 12/2008 |
| CN | 101864671 | 10/2011 |
| CN | 102351774 A | 2/2012 |
| EP | 1639020 | 3/2006 |

(Continued)

*Primary Examiner* — Kara B Boyle (74) *Attorney, Agent, or Firm* — Andrew H. Chung; Linda S. Li; Jason S. Ngui (57) ABSTRACT

This invention discloses the use of sulfite salts as catalysts to make polyurethane polymers. In particular, this invention discloses the use of metal salts such as alkali metal salts as well as alkyl ammonium salts such as tetralkyl ammonium salts as catalysts to make polyurethane polymers. The sulfite salts are useful to make a wide variety of polyurethane polymers and polyurethane foam polymer products such as flexible polyurethane foam polymers, rigid foam polyurethane polymers, semi-rigid polyurethane polymer, microcellular polyurethane polymer, and spray foam polyurethane polymer as well as any polymeric material that requires the assistance of catalysts to promote the formation of urethane and urea bonds such as those found in polyurethane emusions for paints, coatings, protective coatings, lacquer, etc as well as other polyurethane or polyurethane containing materials such as thermoplastic polymers, thermoplastic polyurethane polymers, elastomers, adhesives, sealants, etc. Examples of catalysts comprising the invention include sodium sulfite, potassium sulfite, lithium sulfite, tetramethylammonium sulfite and the like.

4 Claims, 1 Drawing Sheet

(56) References Cited

FOREIGN PATENT DOCUMENTS

| | | | |
|---|---|---|---|
| FR | 1301290 | A | 8/1962 |
| GB | 871291 | | 1/1961 |
| JP | 2005154599 | A | 6/2005 |
| WO | 0158976 | A1 | 8/2001 |
| WO | 03016372 | A1 | 2/2003 |
| WO | 030163373 | A1 | 2/2003 |
| WO | 03055930 | A1 | 7/2003 |
| WO | 2004060956 | A1 | 7/2004 |
| WO | 2006116456 | A1 | 11/2006 |
| WO | 2008138482 | A1 | 11/2008 |
| WO | 2014047230 | A1 | 3/2014 |

* cited by examiner

Figure 1: Rate of Rise of Closed Cell Rigid Foam Made with Potassium Sulfite

Figure 2: Rate of Rise of Closed Cell Rigid Foam-2 and Foam-3

POLYURETHANE CATALYSTS FROM SULFUR BASED SALTS

This application claims benefit of application Ser. No. 14/881,544, filed on Oct. 13, 2015. The disclosure of application Ser. No. 14/881,544 is hereby incorporated by reference.

FIELD OF THE INVENTION

The subject matter of this invention relates to sulfur based salts, catalyst containing those salts, methods for using the catalyst to make polyurethane foams and the resultant foams.

BACKGROUND OF THE INVENTION

WO2008138482A1 claims a process for making polyurethane polymer obtained when at least one polyol is reacted with a polyisocyanate in the presence of catalysts and in the presence of at least a sulfurous compound selected from hydrogen sulfite and disulfite. The sulfurous compound described in this disclosure influence the reactivity of the foam mixture. If the amount of sulfurous compound is large the productivity may not be maintained and the catalyst level need to be adjusted (increase) to keep the foam rise profile similar to the standard mixture without the sulfurous compound. Thus, the sulfuours compounds of WO2008138482A1 are characterized by reducing aldehyde emanations but can be detrimental to foam reactivity beyond the recommended use level.

GB871291 relates to the production of polyester-urethane foam or cellular products which are hydrophilic and are capable of swelling in water and absorb large quantities of water. The disclosure provides a method of imparting hydrophilicity to polyester-polyurethane foam by introducing sulfonate and/or sulfonic acid groups which comprise treating a foamed polyester-urethane mass with an aqueous solution of an alkali metal sulfite or bisulfate at a temperature from room temperature to 100° C.

The previously described patents are hereby incorporated by reference.

BRIEF SUMMARY OF THE INVENTION

The instant invention relates to using sulfites and sulfite salts as catalysts, methods of using such sulfites for making polyurethane foams and to the resultant foams. Multiple problems are solved when using the sulfite salts of the invention as catalysts for making polyurethane polymers. Since the sulfite salts of the invention are able to at least partially or completely replace amine catalysts from formulation the typical quality issues associated with the use of amines are eliminated. These quality issues that are solved by the use of the sulfite salts can comprise: PVC staining, window fogging, amine odor, foam ageing due to humidity and hot humidity, amine emissions as well as aldehyde emissions such as formaldehyde emissions, acetaldehyde emissions, acroleyn emissions as well as emissions form other aldehyde containing compounds. Other problems solved by the sulfite catalyst of the invention can include the partial or total replacement of toxic and/or emissive heavy metal compounds including transition and non-transition metal compounds and salts based on Sn, Hg, Pb, Bi, Zn, among other Group 12, 13, 14 and 15 as well as metals in Groups 3 to 12.

The present invention provides a new method to make polyurethane products utilizing sulfur based compounds and in particular sulfite salts. The sulfite salts of the invention are capable of acting as catalysts to accelerate the reaction between isocyanate containing compounds such as polyisocyanates and OH containing compounds such as polyols and water. The reaction rates are sufficiently high to not only provide polyurethane polymers but also polyurethane foam.

The sulfite salt catalysts of the invention also have several advantages over conventional metal salt catalysts and organometal salt catalysts made from transition metals as well as non-transition metals such as tin, mercury, lead, zinc, bismuth, iron, among other Group 12, 13, 14 and 15 as well as metals in Groups 3 to 12. Advantages include reduction or elimination of emissions from organic fragments such as carboxylic acids and other organic emissions typically observed when using metal salts and organo-metal salts from transition and non-transition metals.

One aspect of the invention relates to a catalyst composition comprising at least one sulfite and at least one other catalyst including tertiary amines, phase transfer catalysts and at least one metal catalyst.

Another aspect of the invention relates to the foregoing aspect wherein the sulfite comprises a compound having a structural formula of $M_2SO_3$ where M is a metal selected from Na, K, Li, Cs, Ca, Mg, Sr, and Ba.

Another aspect of the invention relates to any of the foregoing aspects wherein the sulfite comprises a quaternary ammonium sulfite salt where the quaternary ammonium ion is of the general formula $R^1R^2R^3R^4N$ where $R^1$, $R^2$, $R^3$, $R^4$ are $C_1$-$C_{36}$ alkyl, alkelnyl, aryl, alkylaryl, substituted alkyl, alkenyl or alkylaryl linear, branched with or without heterocyclic containing groups, with or without heteroatoms including nitrogen, oxygen, sulfur and halogen.

A further aspect of the invention relates to any of the foregoing aspects wherein the sulfite comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N-CH_2-C_6H_5)_2SO_3$], cetyltrimethylammonium sulfite [$(Me_3N-(CH_2)_{14}-CH_3)_2SO_3$], N-methyl-pyridinium sulfite [$(Me-C_5NH_5)_2SO_3$], and dialkylimidazolium sulfite salts [$(R_2C_3N_2H_3)_2SO_3$].

A further aspect of the invention relates to any of the foregoing aspects wherein the sulfite comprises mixed sulfite salts obtained when solutions of alkali metal sulfites are mixed with solutions of tetraalkylmmonium salts to produce mixed sulfite salts of general formula $(X''')_m(Y''')_n[SO_3]_{(m\cdot n+n\cdot m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to produce mixed sulfite salts of general formula $[(X^n)_{m \cdot w}][(Y^m)_{n \cdot z}][SO_3]_{(m \cdot n + n \cdot m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

In one aspect of any of the foregoing aspects, the composition is substantially free of amines.

In any of the foregoing aspects the composition is substantially free of metal compounds based on Sn, Hg, Pb, Bi, and Zn.

In any of the foregoing aspects the invention relates to a composition comprising at least one sulfite catalyst and at least one polyol. This aspect can further comprise at least one member selected from the group consisting of at least one blowing agent, and at least one other catalyst including tertiary amines, phase transfer catalysts and at least one metal catalyst.

Another aspect of the invention relates to a process for producing polyurethane foam comprising contacting at least one polyol and at least one isocyante while in the presence of a catalyst comprising at least one sulfite.

A further aspect of the invention relates to a polyurethane foam made by any of the foregoing compositions or processes. Examples of such polyurethane (PU) foam comprise: 1) Flexible PU Foam: A flexible polyurethane foam is a three dimensional agglomeration of gas bubbles separated from each other by thin sections of polyurethane and polyurea polymers and capable of bending without breaking useful for providing comfort, support and cushioning, 2) Rigid PU Foam: A rigid polyurethane foam is a three dimensional agglomeration of gas bubbles separated from each other by thin sections of polyurethane, poly-urea and optionally poly-isocyanurate polymers and unable to bend or force out of shape and useful in providing insulation and structural integrity, and 3) Flexible HR PU Foam: a flexible polyurethane foam that typically weighs 2.5 pounds or more per cubic foot.

A further aspect of the invention relates to methods for using sulfite salts and polyester polyols for making polyurethane foam, and to the resultant foams.

A further aspect of the invention relates to compositions and processes for making flexible High Resilience (HR) foams, and to the resultant foams. Flexible HR foams refer to flexible open cell polyurethane foams that weight typically 2.5 lbs or more per cubic foot or in other word flexible foam with density of 40 Kg/m3 or higher and due to their cell structure are capable of adding more support, comfort and resilience or bounce.

The various aspects of the invention can be used alone or in combination.

DETAILED DESCRIPTION OF THE INVENTION

The present invention relates to sulfites and sulfite salt catalysts. The inventive catalyst can have a structural formula of at least one of: i) $M_2SO_3$ where M is an alkali metal such as Na, K, Li, Cs, ii) $MSO_3$ where M is analkali earth metal such as Ca, Mg, Sr, Ba, and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkelnyl, aryl, alkylaryl, substituted alkyl, alkenyl or alkylaryl linear, branched with or without heterocyclic containing groups. The inventive catalyst comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite $[(Me_4N)_2SO_3]$, tetraethylammonium sulfite $[(Et_4N)_2SO_3]$, tetrabutylammonium sulfite $[(Bu_4N)_2SO_3]$, trimethylbenzyl ammonium sulfite $[(Me_3N—CH_2—C_6H_5)_2SO_3]$, cetyltrimethylammonium sulfite $[(Me_3N—(CH_2)_{14}—CH_3)_2SO_3]$, N-methyl-pyridinium sulfite $[(Me-C_5NH_5)_2SO_3]$, and dialkylimidazolium sulfite salts $[(R_2C_3N_2H_3)_2SO_3]$.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $(X^n)_m(Y^m)_n[SO_3]_{(m \cdot n + n \cdot m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $[(X^n)_{m \cdot w}][(Y^m)_{n \cdot z}][SO_3]_{(m \cdot n + n \cdot m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

Examples of solutions that can be used for obtaining mixed sulfite salts comprise making an aqueous solution of a sulfite salt together with one or more ammonium halide salts of general structure $R^1R^2R^3R^4N$ where $R^1$, $R^2$, $R^3$, $R^4$ are $C_1$-$C_{36}$ alkyl, alkelnyl, aryl, alkylaryl, substituted alkyl, alkenyl or alkylaryl linear, branched with or without heterocyclic containing groups, with or without heteroatoms including nitrogen, oxygen, sulfur and halogen.

The present invention also provides methods to make polyurethane polymers. Catalysts are typically used when making polyurethane polymers in order to accelerate the reaction between OH groups (present in alcohols, polyols and water) and NCO groups (present in isocyanate and polyisocyanate compounds). These catalysts typically include members of the following groups: amine catalysts (for example organic compounds containing tertiary amine groups), metal catalysts which comprise metal salts and/or organo-metal salts of transition metals as well as non-transition metals such as Sn, Bi, Zn, Hg, Pb, Fe, etc) and/or alkali, alkali-earth or ammonium (such as tetralkyl ammonium) salts of organic oxo-compounds such as carboxylic acid, alcohols, phenols and the like.

The present invention provides a new method to make polyurethane products utilizing sulfite salts. The reaction rates obtained using the sulfite salts of the invention are sufficiently high to provide not only polyurethane polymers but also polyurethane polymer foam.

Multiple advantages are observed when making polyurethane polymers using the sulfite salts of the invention because many of the quality issues that can be observed in finished products made with conventional tertiary amine as catalysts are eliminated. Some of the quality issues such as PVC staining, amine emissions, amine leaching when exposed to water and other liquids, amine odor, fogging, humid aged degradation as well as other degradative processes typically associated with amines are eliminated or minimized when using the sulfite salts of the invention. In addition, the sulfite salts can be used to fully or partially replace transition and non-transition metal catalysts salts such as carboxylate salts of Sn, Bi, Zn, Fe, Hg, Pb, among others. Metal and organo-metal salts from transition and non-transition metals commonly used as polyurethane catalysts are typically organic carboxylate salts that can lead to emissions of carboxylic acids and other organic fragments once the polymerization process is completed. These emissions can be eliminated or minimized when using the sulfite salts of the invention (e.g., amine emissions from a catalyst source, when measured in accordance with VDA-278, can eliminated). Further, the sulfite salts of the invention eliminate the need for the incorporation of toxic transition metal catalyst complexes such as Sn, Hg or Pb in polyurethane processes. Furthermore, the sulfite salts of the invention can reduce, if not eliminate, aldehyde emissions from materials for making polyurethanes as well as polyurethanes obtained from the invention. The inventive sulfite salts can function as aldehyde scavengers thereby converting at least one of the following aldehydes/ketones into their corresponding sulfite/bisulfite adducts: formaldehyde, acetalhyde, acrolein, 2-propenal, propanal, 2-buterial, butyraldehyde, benzaldehyde, 3-methylbutanal, pentanal, o-tolualdehyde, m- and p-tolualdehyde, hexanal, 2,5-dimethylbenzaldehyde, cyclohexanone, glutaral, heptanal, octanal, nonanal, decanal.

In one aspect of the invention, the inventive sulfite salts are used as a solution of salts in at least one medium selected from the group consisting of water, ethylene glycol, diethylene glycol, polyethylene glycol, propylene glycol, dipropylene glycol, polypropylene glycol, 1,3-butanediol, 1,3-butanediol, 1,4-butanediol, 1,6-hexanediol, neopentyl glycol, pentaerythritol, glycerol, diglycerol, and trimethylol propane. The amount of medium can range from about 5 to 50, about 10 to about 35 and in some cases about 10 to 20 wt. % of the solution.

When using the sulfite salt catalysts of the invention the foam produced is characterized by a) reduced overall emissions as measured for example by the VDA 278 method because either all or most of the amine catalysts can be replace by non-volatile sulfite salt catalysts; b) excellent physical properties; c) minimal or no deterioration of other materials that can get in contact with the polyurethane polymer such as PVC or polycarbonate; d) low odor because sulfite salts have negligible vapor pressure compared to amine catalysts; e) partial of full elimination of toxic or harmful transition metal and organo-transition metal salts catalysts such as Sn, Bi, Pb, Hg, Zn, among others. Flexible molded foams characterized by excellent physical properties typically have target density (ASTM 3574-A) with range of about 28 to about 80 $kg/m^3$, air flow (ASTM 3574-G) with range of about 40 to about 120 L/M, ILDs (indentation load deflection method ASTM 3574-B1) with range of about 150 to about 600 N, support factor (ASTM 3574-B1) with range of about 2.5 to about 3.5, preferably about 3, and resilience (ASTM 3574-H) range of about 40 to about 80%. In one aspect of the invention a desirable foam has a Tensile/HA Tensile/Elongation/HA Elongation=DIN 53571—Range of about 80 to about 200%, a 50% Compression Set=ASTM D3574-D—Range of about 1 to about 20%, a HA Compression Set=ASTM D3574-J1 and J2—Range of about 5 to about 15%, and Tear=ASTM D3574-F—Range of about 150 to about 400. In another aspect of the invention a flexible open cell HR foam are characterized by having a density of 40 Kg/m3 or higher and due to their cell structure are capable of adding more support, comfort and resilience or bounce.

The sulfite catalyst of the invention can be used with or without other amine gelling catalysts. The gelling catalysts can be conventional gelling like those having no isocyanate reactive groups in their molecular structure catalysts or they can be gelling catalysts having isocyante reactive groups in their molecular structure such as at least one of OH (alcohol), $NH_2$ (amine, amide, urea), =NH (amine, amide, urea), among others. The amine catalyst can also be acid blocked with an acid including carboxylic acids (alkyl, substituted alkyl, alkylene, aromatic, substituted aromatic) sulfonic acids or any other organic or inorganic acid. Examples of carboxylic acids include mono-acids, di-acids or poly-acids with or without isocyanate reactive groups. Examples of carboxylic acids include formic acid, acetic acid, propionic acid, butanoic acid, pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, myristic acid, pentadecanoic acid, hexadecanoic acid, heptadecanoic acid, octadecanoic acid, benzoic acid, oxalic acid, malonic acid, succinic acid, glutaric acid, adipic acid, pimelic acid, suberic acid, azelaic acid, sebacic acid, glycolic acid, lactic acid, tartaric acid, citric acid, malic acid, salicylic acid and the like.

The sulfite salt catalysts of the invention can be used with or without amine blowing catalysts such as at least one of bis(dimethylaminoethyl)ether, pentamethyldiethylene triamine, hexamethyltriethylenetetraamine, N,N,N'-trim ethyl-N'-3-aminopropyl-bis(aminoethyl) ether or 2-[N-(dimethylaminoethoxyethyl)-N-methylamino]ethanol, among others.

Typically, the loading of the sulfite catalyst(s) for making foam according to the invention will be in the range of about 0.01 to about 20 pphp, more typically about 0.1 to about 10 pphp, and most typically about 0.1 to about 5 pphp. The term "pphp" means parts per hundred parts polyol. The amount of the other foregoing catalyst, if employed, will be in the range of about 0.01 pphp to about 20 pphp, more typically about 0.10 pphp to about 10 pphp and most typically about 0.10 pphp to about 5 pphp.

Typically the loading of the tertiary amine gelling catalysts will be between about 0 pphp (no gelling catalyst) and about 20 pphp, between about 0.1 pphp and about 10 pphp, between about 0.1 pphp and about 5 pphp, or any suitable combination or sub-combination thereof. Typically the loading of the tertiary amine blowing catalysts will be between about 0 pphp (no blowing catalyst) and about 20 pphp, between about 0.1 pphp and about 10 pphp, between about 0.1 pphp and about 5 pphp, or any suitable combination or sub-combination thereof.

Without wishing to be bound by any theory or explanation, it is believed that the inventive sulfite catalyst can interact with or bond to a polyol and an isocyanate to form a reaction product. The reaction product can be used in a wide range of applications that employ urethane chemistry including adhesives, coatings, foams, sealants, among other applications.

Further aspect of the invention relates to a process for making polyurethane foams by using the inventive catalysts and to the resultant foams. In particular, the instant invention relates to the use of sulfite salts to prepare polyurethane polymers including polyurethane foam polymers. The general advantages of using the sulfite salts of the invention to produce polyurethane polymers include: a) lower odor due to the ionic character and negligible vapor pressure of the sulfite salts relative to conventional amine catalysts; b) lower emissions due to the ionic character of the sulfite salts as well as their inhability to release toxic vapors as compared to conventional amine catalysts and transition and organo-transition carboxylate salts of Sn, Bi, Pb, Hg, etc; c) excellent physical properties; d) reduction or elimination of aldehyde emissions; e) no damage to other materials in contact with the polyurethane polymer such as PVC or polycarbonate; f) improved foam stability under hot and humid conditions. Flexible molded foams characterized by excellent physical properties typically have target density (ASTM 3574-A) with range of about 28 to about 80 kg/m$^3$, air flow (ASTM 3574-G) with range of about 40 to about 120 L/M, ILDs (indentation load deflection method ASTM 3574-B1) with range of about 150 to about 600 N, support factor (ASTM 3574-B1) with range of about 2.5 to about 3.5, preferably about 3, and resilience (ASTM 3574-H) range of about 40 to about 80%. In one aspect of the invention a desirable foam has a Tensile/HA Tensile/Elongation/HA Elongation=DIN 53571—Range of about 80 to about 200%, a 50% Compression Set=ASTM D3574-D—Range of about 1 to about 20%, a HA Compression Set=ASTM D3574-J1 and J2—Range of about 5 to about 15%, and Tear=ASTM D3574-F—Range of about 150 to about 400. Humid aged physical properties are measured after foam have been aged following the VW procedure: place samples to be tested in a dry oven at 90° C. for 24 hours for drying. Once dried, age samples for 200 hours @ 90° C. and 100% relative humidity. Samples are then dried after ageing in a dry oven at 70° C. for 22 hours. Samples are removed from drying oven and allowed to equilibrate at ambient conditions before measuring physical properties. Optimal humid aged physical properties for flexible molded foam are typically as follows: Humid Aged Tensile Strength≥70 Kpa (DIN 53571), 50% Humid Aged Compression Set (HACS)≤40% (ASTM 3574-D); Humid Aged Elongation≥70% (DIN 53571) and Humid Aged Load Loss (HALL) −40 to +30. Amine emissions in foam are measured using thermodesorption analysis and the substances emitted at 90° C. (VOC) and 120° C. (FOG) are quantified according to VDA 278 method. For this purpose a sample of the test material is conditioned to the corresponding temperature (90° C. from VOC and 120° C. for FOG) under the flow of inert gas, and the substances released are frozen out in the refrigerated injector of the gas chromatograph. The mixture is then passed through the gas chromatographic column and the total emissions quantified. The VOC and FOG are measured with the same sample. Quantification of the gaseous emissions (VOC) is made against an external toluene standard while the condensable emissions (FOG) are quantified against hexadecane ($C_{16}$-n-alkane). The concentrations are reported in ppm as total emissions in toluene and hexadecane equivalents. The sulfite salt catalysts used in the invention are crystalline ionic materials with no or negligible vapor pressure and consequently non-emissive.

Preparation of Plyurethane Foams

Flexible Foam

Foams of any of the various types known in the art may be made using the methods of this invention, using typical polyurethane formulations to which have been added the appropriate amount of sulfite salt catalyst. For example, flexible polyurethane foams with the excellent characteristics described herein will typically comprise the components shown below in Table I, in the amounts indicated. The components shown in Table I will be discussed in detail later below.

TABLE I

Polyurethane Components

| Component | Parts by Weight |
|---|---|
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-115 |

The amount of polyisocyanate used in polyurethane formulations according to the invention is not limited, but it will typically be within those ranges known to those of skill in the art. An exemplary range is given in table I, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

Flexible foams typically use copolymer polyols as part of the overall polyol content in the foam composition, along with base polyols of about 4000-5000 weight average molecular weight, a functionality number of 1 to 6 and more typically 2 to 4 and hydroxyl number of about 28-35. Base polyols and copolymer polyols will be described in detail later herein.

Rigid Foam

Foams of any of the various types known in the art may be made using the methods of this invention, using typical polyurethane formulations to which have been added the appropriate amount of sulfite salt catalyst. For example, rigid polyurethane foams with the excellent characteristics described herein will typically comprise the components shown below in Table II, in the amounts indicated. The components shown in Table II will be discussed in detail later below.

TABLE II

Polyurethane Components

| Component | Parts by Weight |
|---|---|
| Polyether Polyol | 0-100 |
| Polyester Polyol | 0-100 |
| Mannich Polyol | 0-100 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 80-500 |

The amount of polyisocyanate used in polyurethane formulations according to the invention is not limited, but it will typically be within those ranges known to those of skill in the art. An exemplary range is given in table II, indicated by reference to "NCO Index" (isocyanate index) as defined as above.

Rigid foams typically use aromatic polyester polyols as part of the overall polyol content in the foam composition, along with base polyols (polyether polyols) of about 200-5000 weight average molecular weight, a functionality number of 1 to 6 and more typically 2 to 5 and hydroxyl number of about 50-800. Base polyester polyols and polyether polyols will be described in detail later herein.

Flexible Polyester Based Foam

Foams of any of the various types known in the art may be made using the methods of this invention, using typical polyurethane formulations to which have been added the appropriate amount of sulfite salt catalyst. For example, flexible polyester based polyurethane foams with the excellent characteristics described herein will typically comprise the components shown below in Table III, in the amounts indicated. The components shown in Table III will be discussed in detail later below.

TABLE III

Polyurethane Components

| Component | Parts by Weight |
|---|---|
| Base Polyester Polyol | 20-100 |
| Polyether Polyol | 0-80 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-130 |

The amount of polyisocyanate used in polyurethane formulations according to the invention is not limited, but it will typically be within those ranges known to those of skill in the art. An exemplary range is given in table I, indicated by reference to "NCO Index" (isocyanate index) as defined above.

Flexible polyester foams typically use polyester polyols as part of the overall polyol content in the foam composition, along with polyether polyols of about 4000-5000 weight average molecular weight, a functionality number of 1 to 6 and more typically 2 to 4 and hydroxyl number of about 28-35. Base polyols and copolymer polyols will be described in detail later herein.

Flexible HR Foam

Foams of any of the various types known in the art may be made using the methods of this invention, using typical polyurethane formulations to which have been added the appropriate amount of sulfite salt catalyst. For example, flexible HR polyurethane foams with the excellent characteristics described herein will typically comprise the components shown below in Table IV, in the amounts indicated. The components shown in Table IV will be discussed in detail later below.

TABLE IV

Polyurethane Components

| Component | Parts by Weight |
|---|---|
| Base Polyol | 20-60 |
| Polymer polyol | 40-80 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-115 |

The amount of polyisocyanate used in polyurethane formulations according to the invention is not limited, but it will typically be within those ranges known to those of skill in the art. An exemplary range is given in table I, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

Flexible foams typically use copolymer polyols as part of the overall polyol content in the foam composition, along with base polyols of about 4000-5000 weight average molecular weight, a functionality number of 1 to 6 and more typically 2 to 4 and hydroxyl number of about 28-35. Base polyols and copolymer polyols will be described in detail later herein.

Catalysts

The present invention relates to sulfites and sulfite salt catalysts. The inventive catalyst can have a structural formula of at least one of: i) $M_2SO_3$ where M is an alkali metal such as Na, K, Li, Cs, ii) $MSO_3$ where M is analkali earth metal such as Ca, Mg, Sr, Ba, and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkelnyl, aryl, alkylaryl, substituted alkyl, alkenyl or alkylaryl linear, branched with or without heterocyclic containing groups. The inventive catalyst comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N—CH_2—C_6H_5)_2SO_3$], cetyltrimethylammonium sulfite [$(Me_3N—(CH_2)_{14}—CH_3)_2SO_3$], N-methyl-pyridinium sulfite [$(Me-C_5NH_5)_2SO_3$], and dialkylimidazolium sulfite salts [$(R_2C_3N_2H_3)_2SO_3$].

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $(X^n)_m(Y^m)_n$ $[SO_3]_{(m \cdot n + n \cdot m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $[(X^n)_{m \cdot w}][(Y^m)_{n \cdot z}]$ $[SO_3]_{(m \cdot n + n \cdot m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

The inventive catalyst can be manufactured by any suitable method such as passing $SO_2$ (sulfur dioxide) through an alkaline solution. The alkaline solution can be an alkali, alkali earth or quaternary ammonium hydroxide solution. Similarly, sulfite salts can be manufacture by reaction of $SO_2$ with alkali and alkali earth carbonate salts according to prior art procedures. Alternatively, some sulfite salts can be made by ion exchange for example between sodium sulfite and a metal chloride or a quaternary ammonium chloride. The sulfite salt can be used as aqueous solution or the sulfite salt can be dissovled in a glycol solvent such as ethylene glycol, propylene glycol, polyethylene glycol, polypropylene glcycol, MP-diol, glycerin, among other solvents, for applications where water needs to be minimized. Sulfite salts synthesis and manufacturing are described in a) "Sulfur Compounds" by Edward D Weil, Stanley R Sandler and Michael Gernon; Kirk Othmer Encyclopedia of Chemical Technology, 16 Jun. 2016, Section 13.1 and ref rences therein; b) "Sulfites, Thiosulfates and Dithionites"; Jose Jimenez Barbera, Adolf Metzger, Manfred Wolf, Ullman's Encyclopedia of Industrial Chemistry pp. 695-704; 15 Jun. 2000 and ref rences therein; the disclosure of which is hereby incorporated by reference. The concentration of sulfite salt in solvent can range from about 0.1 wt. % to about 40 wt. %.

The sulfite salt catalysts of the present invention can be used as the sole gelling catalyst but, in some cases, the sulfite salt catalysts can be used in the presence of other catalysts including at least one member selected from the group consisting of tertiary amine, transition metal catalysts, non-transition metal catalysts, organo-transition metal catalysts, organo-non-transition metal catalysts and carboxylate salts. Tertiary amine co-catalysts also include those containing isocyanate reactive groups such as primary amine, secondary amine, hydroxyl group, amide and urea. Examples of tertiary amine gelling having isocyanate reactive groups include at least one of N,N-bis(3-dimethylamino-propyl)-N-(2-hydroxypropyl) amine; N,N-dimethyl-N',N'-bis(2-hydroxypropyl)-1,3-propylenediamine; dimethylaminopropylamine (DMAPA); N-methyl-N-2-hydroxypropyl-piperazine, bis-dimethylaminopropyl amine (POLYCAT® 15), dimethylaminopropyl urea and N,N'-bis(3-dimethylaminopropyl) urea (DABCO® NE1060, DABCO® NE1070, DABCO® NE1080 and DABCO® NE1082), 1,3-bis(dimethylamino)-2-propanol, 6-dimethylamino-1-hexanol, N-(3-aminopropyl)imidazole, N-(2-hydroxypropyl)imidazol, N,N'-bis(2-hydroxypropyl) piperazine, N-(2-hydroxypropyl)-morpholine, N-(2-hydroxyethylimidazole). Examples of tertiary amine blowing co-catalysts containing isocyanate reactive groups include 2-[N-(dimethylaminoethoxyethyl)-N-methylamino]ethanol (DABCO® NE200), N,N,N'-trimethyl-N'-3-aminopropyl-bis(aminoethyl) ether (DABCO® NE300). Other catalysts that can be used with the sulfite salts include metal catalysts such as transition metal and post-transition metals catalysts such as organotin compounds or bismuth carboxylates for example when the desired polyurethane foam is a flexible slab stock. Metal catalyst can also comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

In one aspect of the invention, sulfite catalyst are employed with at least one phase transfer catalyst. Examples of suitable phase transfer catalyst comprise at least one member selected from the group consisting of carboxylates, sulfonates, halide ions, sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like. While the sulfite salt catalysts of the instant invention can be used with amines listed above, such usage can increase emissions from foam during its useful lifetime as well as during foam manufacturing because either the vapor pressure of the amine catalyst itself is too high to be retained in the polyurethane foam or because the thermal stability of the chemical bonds formed between the isocyanate reactive tertiary amine and the isocyanate are not as stable when exposed to heat and/or humidity. Typically, the loading of the sulfite catalyst(s) for making foam according to the invention will be in the range of about 0.01 to about 20 pphp, more typically about 0.1 to about 10 pphp, and most typically about 0.1 to about 5 pphp. The term "pphp" means parts per hundred parts polyol. The amount of the other foregoing catalyst(s), if employed, will be in the range of about 0.01 pphp to about 20 pphp, more typically about 0.10 pphp to about 10 pphp and most typically about 0.10 pphp to about 5 pphp.

In some cases, a pre-mix comprising the sulfite catalyst is prepared. The pre-mix can comprise at least one or all of the other foam making components (with the exception of an isocyanate). The pre-mix and isocyante can be contacted thereby producing a polyurethane.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's. While any suitable isocyanate can be used, an example of such comprises isocyanate having an index range from about 20 to about 120 and typically from about 40 to 110 and more typically from about 90 to about 110. The amount of isocyanate typically ranges from about 95 to about 105.

Polyol Component

Polyurethanes are produced by the reaction of organic isocyanates with the hydroxyl groups of polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyether polyols also include those containing tertiary amine groups than can catalyze the gelling and the blowing reaction of polyurethanes, for example those described in U.S. Pat. No. 8,367,870; WO 03/016373 A1, WO 01/58976 A1; WO2004/060956 A1; WO03/016372 A1; and WO03/055930 A1; the disclosure of the foregoing WO publications is hereby incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures.

In addition to the base polyols described above, or instead of them, materials commonly referred to as "copolymer polyols" may be included in a polyol component for use according to the invention. Copolymer polyols may be used in polyurethane foams to increase the resistance to deformation, for example to improve the load-bearing properties. Depending upon the load-bearing requirements, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Other suitable polyols that can be used according to the invention include natural oil polyols or polyols obtained from renewable natural resources such as vegetable oils. Polyols useful in the preparation of polyurethane foam from inexpensive and renewable resources are highly desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

Other suitable polyols include amine polyether polyols such as Mannich polyols. Mannich polyols are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. Mannich polyols are also used in spray foam formulations to increase the reactivity of the system. Typical Mannich polyols are typically prepared by condensation of phenol with formaldehyde in the presence of hydroxyl containing amines such as diethanolamine, ethanolamine and the like.

Open cell flexible molded foams typically use a main or "base" polyether polyol. Polyether polyols include poly (alkylene oxide) polymers such as poly(ethylene oxide) and poly(propylene oxide) polymers and copolymers with terminal hydroxyl groups derived from polyhydric compounds, including diols and triols. These polyols can have a functionality of about 2 to about 8, about 2 to about 6 and typically about 2 to about 4. The polyols can also have a hydroxyl number from about 10 to about 900, and typically about 15 to about 600 and more typically about 20 to about 50. Flexible molded foams also use copolymer polyols as part of the overall polyol content in the foam composition with OH numberst typically in the range of 15 to 50, MW ranges typically from 1200 to 8000 and more typically 2000 to 6000 and % solids form 10% to 60%. Open cell low density spray foam typically use a polyether polyol with an average MW from 1500 tp 6000 and OH number from 15 to 50. Polyols amounts are defined by pphp. There are 4 types of polyols above defined: standard polyol or polyether polyol which can be used in the range of about 100 pphp (the only polyol) to about 10 pphp. The copolymer polyol (CPP) can be used in the range of about 0 to about 80 pphp. The NOP (natural oil polyol) can be present from about 0 to about 40 pphp. Finally, the Mannich polyol is used in combination with other polyol and in a range from 0 pphp to 80 pphp, about 0 pphp to about 50 pphp and in some cases about 0 pphp to about 20 pphp.

Polyester polyols can also be used, including those produced when a dicarboxylic acid is reacted with an excess of a diol. Non-limiting examples include adipic acid or phathalic acid or phthalic anhydride reacting with ethylene glycol, diethylene glycol, polyethylene glycols, propylene glycol, dipropylene glycol, polypropylene glycol, butanediol, hexanediol and the like.

Most common polyester polyols are made from phthalic, isophthalic and terephthalic acids. Esterification of these acids with polyol initiators such as ethylene glycol, diethylene glycol, propylene glycol, dipropylene glycol, butanediol, polyethylene glycols of various molecular weights, glycerin, pentanetriol, and the like can yields polyester polyols with different physical properties, molecular weights and molecular architectures but all characterized by their poor hydrolytic stability.

Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

The polyol can have an OH number of about 5 to about 600, about 100 to about 600 and in some cases about 50 to about 100. and a functionality of about 2 to about 8, about 3 to about 6 and in some cases about 4 to about 6.

The amount of polyol can range from about 0 pphp to about 100 pphp about 10 pphp to about 90 pphp and in some cases about 20 pphp to about 80 pphp.

Blowing Agents

Polyurethane foam production may be aided by the inclusion of a blowing agent (BA) to produce voids in the polyurethane matrix during polymerization. Any suitable blowing agent may be used. Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of low reactivity blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making CO2) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, alkali and alkali earth carboxylate salts and combinations of any of these.

Cell stabilizers may include, for example, silicone surfactants as well as organic anionic, cationic, zwiterionic or nonionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Cell stabilizers can be used in an amount from about 0.1 to about 20 pphp and typically from about 0.1 to about 10 pphp and, in some cases, from about 0.1 to about 5.0 pphp. Crosslinking agents can be used in an amount from about 0 pphp (no crosslinker) to about 20 pphp. Chain extenders can be used in an amount from about 0 pphp (no chain extender) to about 20 pphp. Fillers can be used in an amount from about 0 pphp (no fillers) to 40 pphp. Fire retardants can be used in an amount from about 0 to about 20 pphp and from about 0 to about 10 pphp and from about 0 to about 5 pphp.

In one aspect of the invention, the catalyst composition, foam manufacturing process and resultant foam are substantially free of amines. By "substantially free" it is meant that the foregoing contain less than about 10 pphp, typically less than about 5 pphp and in some cases 0 pphp of amines.

In another aspect of the invention, the catalyst, composition, foam manufacturing process and resultant foam are substantially free of toxic and/or emissive transition metal compounds based on Sn, Hg, Pb, Bi, Zn, among others. By "substantially free" it is meant that the foregoing contain less than about 10 pphp, typically less than about 5 pphp and in some cases 0 pphp of such metals.

In a further aspect of the invention, the catalys, composition, foam manufacturing process and resultant foam are substantially free of amines and toxic and/or emissive transition metal compounds.

Certain aspects of the invention are illustrated by the following Examples. These Examples are illustrative only and shall not limit the scope of any claims appended hereto. Foams were evaluated by using Handmix Evaluations or Machine Evaluations as described below.

Example 1

Preparation of Rigid Polyurethane Polymers Made with Potassium Sulfite Salt

Rigid foam typically used in home insulation has been made using sulfite salts such as potassium sulfite. A closed cell rigid foam formulation in which the amine catalysts were replaced by concentrated aqueous solution of potassium sulfite in water made at room temperature (25° C.) is shown in Table 1.

TABLE 1

Standard rigid spray foam formulation

| Component | Foam-1 pphp* |
|---|---|
| Polyester Polyol (OH# = 304) | 50 |
| Mannich Polyol (OH# = 465) | 50 |
| Flame Retardant (TCPP) | 21.5 |
| Surfactant (Dabco ® DC193) | 0.25 |
| 20% Potassium Sulfite Solution in Water | 3.75 |
| MDI Index | 120 |

*Parts per hundred polyol (wt).

The above components were mixed and approximately 20 g of the above premix were mixed with isocyanate (MDI) to achieve an index of 120 in a mechanical agitator in a 32 oz (~946.3 ml) litter plastic container. The time in seconds required for the foaming mass to reach the top of the cup was measured in seconds using a chronometer.

Table 2 shows foam rate of rise kinetic values for high density rigid closed cell spray foam formulation. The kinetic values were measured using using a standard FOMAT instrument equipped with an ultrasonic sensor. The Top of the Cup time in seconds was measured using a chronometer when the foam mass reach the top of the mixing cup.

TABLE 2

Foam Rate of Rise Kinetic Values

| Parameter | Foam-1 |
|---|---|
| Use level of Neat Salt Excluding Water (pphp) | 0.75 |
| Time to Reach Top of the Cup | 15 |
| Start time (s) | 9 |
| Chice time (s) | 16 |
| Rise time (s) | 25 |
| Max. Height (mm) | 181 |
| Final Height (mm) | 181 |
| Shrinkage (%) | 0.3 |

Figure 1:
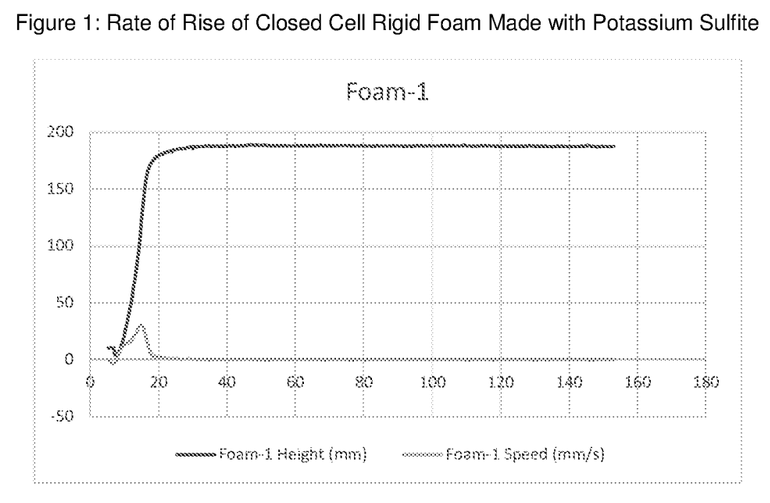
FIG. 1 is a graphical representation in terms of seconds v. mm of the rate of rise for foams made in accordance with Example 1.

Referring now to FIG. 1, FIG. 1 is a graphical representation in terms of seconds v. mm of the rate of rise for foams made in accordance with this Example 1.

Example 2

Preparation of Rigid Polyurethane Polymers Made with Potassium Sulfite Salt in Combination with Amine Catalysts In this example rigid foam typically used in home insulation has been made using sulfite salts such as potassium sulfite used in combination with a mixture of gelling and blowing amine catalysts. The catalysts combination used are shown in Table 4 in which the amine gelling catalysts tris(dimethylaminopropyl) amine and dimethylamino hexadecylamine and the blowing amine catalyst pentamethyldiethylenetriamine were used in combination with a 20% aqueous solution of potassium sulfite.

The components were mixed and approximately 20 g of the above premix were mixed with isocyanate (MDI) to achieve an index of 120 in a mechanical agitator in a 32 oz (~946.3 ml) litter plastic container. The time in seconds required for the foaming mass to reach the top of the cup was measured in seconds using a chronometer.

TABLE 3

Standard rigid spray foam formulation

| Component | Foam-2 pphp* | Foam-3 pphp* |
|---|---|---|
| Polyester Polyol (OH# = 304) | 50 | 50 |
| Mannich Polyol (OH# = 465) | 50 | 50 |
| Flame Retardant (TCPP) | 21.5 | 21.5 |
| Surfactant (Dabco ® DC193) | 0.25 | 0.25 |
| Amine Gelling Catalyst 1: bis(dimethylaminopropyl)amine | 0.77 | 0.68 |
| Amine Gelling Catalyst 2: dimethylaminohexadecylamine | 0.35 | 0.30 |
| Amine Blowing Catalyst: Pentamethyldiethylenetriamine | 0.28 | 0.25 |
| 20% Potassium Sulfite Solution in Water | — | 3.75 |
| Water | 3.06 | — |
| MDI Index | 120 | 120 |

*Parts per hundred polyol (wt).

Table 4 shows foam rate of rise kinetic values for high density rigid closed cell spray foam formulation. The kinetic values were measured using using a standard FOMAT instrument equipped with an ultrasonic sensor. The Top of the Cup time in seconds was measured using a chronometer when the foam mass reach the top of the mixing cup.

TABLE 4

Foam Rate of Rise Kinetic Values

| Parameter | Foam-2 | Foam-3 |
|---|---|---|
| Use level of Neat Salt Excluding Water (pphp) | — | 0.75 |
| Time to Reach Top of the Cup | 10 | 10 |
| Start time (s) | 6 | 6 |
| Chice time (s) | 11 | 11 |
| Rise time (s) | 16 | 15 |
| Max. Height (mm) | 184 | 206 |
| Final Height (mm) | 184 | 204 |
| Shrinkage (%) | 0.5 | 0.8 |

TABLE 5

Standard Rigid Formulation for Laminate

| Component | pphp* |
|---|---|
| Polyether Polyol Pluracol ®SG-360 | 50 |
| Aromatic Polyester Polyol Stepnpol ® PS-2352 | 50 |
| Flame Retardant Fyrol PCF (TCPP) | 10 |
| Silicon Surfactant Dabco ®DC193 | 2 |
| Water | 3.00 |
| Catalysts | Varied |
| N-Pentane | 5.0 |
| Rubinate M (MDI) | 158 |
| MDI Index | 136 |

*Parts per hundred polyol (wt).

Table 6 shows the values for cream time, top of the cup and string gel time for various catalysts combinations used with and without various tetralkylammonium phase transfer catalysts.

TABLE 6

Catalysts Combinations Using Phase Transfer Catalysts for Polyether and Polyester Polyol Based Rigid Foam

| Foam | Catalyst-1 | pphp[3] | Catalyst-2 | pphp[3] | PTC[4] | pphp[3] | CT[5] | TOC[6] | SGT[7] |
|---|---|---|---|---|---|---|---|---|---|
| 4 | DMI | 1.70 | — | — | — | 1.70 | 24 | 56 | 80 |
| 5 | DMI | 1.10 | $K_2SO_3$ | 0.63 | $Me_4NCl$ | 0.76 | 25 | 62 | 80 |
| 6 | DMI | 1.3 | $K_2SO_3$ | 0.68 | $Me_4NCl$ | 0.46 | 25 | 58 | 78 |
| 7 | DMI | 1.4 | $K_2SO_3$ | 0.70 | $BzMe_3NCl$ | 0.82 | 23 | 60 | 80 |

[1]DMI is a 50% solution of 1,2-Dimethylimidazole in ethylene glycol.
[2]$K_2SO_3$ is potassium sulfite salt which is dispensed in the formulation as a 20% water solution in a manner according to formulation shown in table 6 to make a total amount of water equal to 3.0 pphp in all cases.
[3]ppp is part per one hundred part of polyol.
[4]PCT means a phase transfer catalyst.
[5]CT means cream time and represent the time in seconds for the whole mixture of components including isocyanate to show a creamy appearance indicating the onset or beginning for the mixture to expand.
[6]TOC represent the time in seconds for the foaming mass to reach the top of the cup.
[7]SGT means string gel time which is the time in seconds for the polymerizing mass to for strings when touched with a wooden tongue suppressor.

Figure 2:
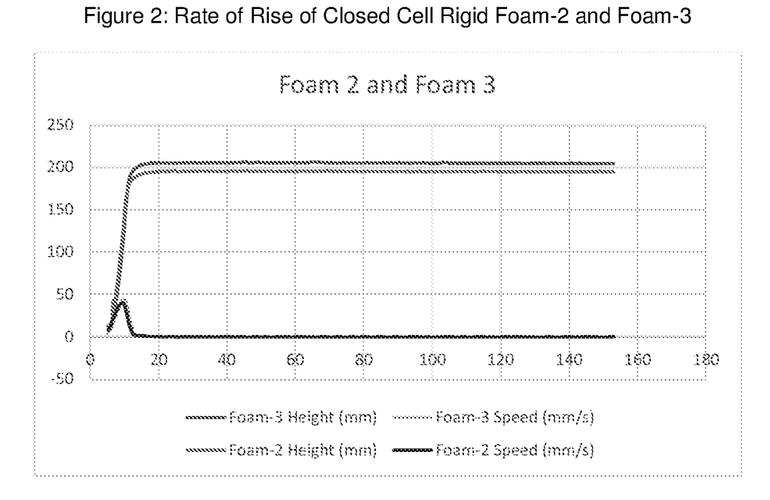
FIG. 2 is a graphical representation in terms of seconds v. mm of the rate of rise for foams made in accordance with Example 2.

Referring now to FIG. 2, FIG. 2 is a graphical representation in terms of seconds v. mm of the rate of rise for foams made in accordance with this Example 2.

Example 3

Preparation of Rigid Lamination Polyurethane Polymers Made with Potassium Sulfite Salt in Combination with Amine Catalysts and Phase Transfer Catalysts In this example rigid foam typically used in rigid lamination has been made using sulfite salts such as potassium sulfite used in combination with an amine catalysts. The formulation used is shown in Table 6.

The components were mixed and approximately 20 g of the above premix were mixed with isocyanate (MDI) to achieve an index of 120 in a mechanical agitator in a 32 oz (~946.3 ml) litter plastic container. The time in seconds required for the foaming mass to reach the top of the cup was measured in seconds using a chronometer.

The kinetic values were measured using using a standard FOMAT instrument equipped with an ultrasonic sensor. The Top of the Cup time in seconds was measured using a chronometer when the foam mass reach the top of the mixing cup.

Example 4

Preparation of Free Rise Flexible Polyurethane Foam Made with Polyester Polyols

In this example a polyester polyol based flexible polyurethane foam were made according to the components shown in Table 7.

The components were mixed and approximately 20 g of the above premix were mixed with isocyanate (MDI) to achieve an index of 120 in a mechanical agitator in a 32 oz (~946.3 ml) litter plastic container. The time in seconds required for the foaming mass to reach the top of the cup was measured in seconds using a chronometer.

TABLE 7

Standard Polyester Polyol Based Flexible Foam Formulation

| Component | pphp* |
|---|---|
| Polyester Polyol Desmophen ® 2200B | 100 |
| Silicon Surfactant Dabco ®DC1990 | 0.75 |
| Water | 5.00 |
| Catalyst | Varied |
| TDI Index | 95 |

*Parts per hundred polyol (wt).

TABLE 8

Catalysts Combinations Using Phase Transfer Catalysts for Polyester Polyol Based Flexible Foam

| Foam | Catalyst-1 | pphp[3] | Catalyst-2 | pphp[3] | PTC[4] | pphp[3] | TOC[5] |
|---|---|---|---|---|---|---|---|
| 8 | Dabco ®NEM[1] | 1.50 | — | — | — | — | 66 |
| 9 | — | — | $K_2SO_3$[2] | 0.88 | — | — | 98 |
| 10 | — | — | $K_2SO_3$ | 0.81 | $BzMe_3NCl$ | 1.43 | 66 |
| 11 | Dabco ®NEM | 0.75 | $K_2SO_3$ | 0.44 | $BzMe_3NCl$ | 1.43 | 72 |

[1]Dabco ®NEM is N-ethylmorpholine.
[2]$K_2SO_3$ is potassium sulfite salt which is dispensed in the formulation as a 20% water solution in a manner according to formulation shown in table 8 to make a total amount of water equal to 5.0 pphp in all cases.
[3]ppp is part per one hundred part of polyol.
[4]PCT means a phase transfer catalyst.
[5]TOC represent the time in seconds for the foaming mass to reach the top of the cup.

Table 8 shows that a similar rise time can be seen in a flexible polyester polyol based formulation when N-ethylmorpholine is replaced by potassium sulfite in the presence of a phase transfer catalyst.

Example 5

TDI Based Flexible HR Foam Kinetic Data and Foam Physical Properties when Using Potassium Sulfite as Gelling Catalysts Flexible HR TDI based foam pad samples were made using the formulation shown in Table 9. Various use levels and combinations of potassium sulfite catalysts and Dabco®NE300 were tested to make foam pads with approximate densities in the range of 40 Kg/m3 and compared with similar foam made with conventional gelling catalyst Dabco®NE1070 and blowing catalyst Dabco®NE300.

TABLE 9

General TDI Flexible HR Formulation

| Component | Pphp |
|---|---|
| Specflex ®NC630 Polyol[1] | 50 |
| Specflex ®NC700 Polyol[2] | 50 |
| Dabco DC6070[3] | 0.60 |
| Dabco ®NE300[4] | 0.17 |
| Dabco ®NE1070[4] | 0.70 |
| Water | 3.0 |
| Diethanolamine | 0.70 |
| TDI Index | 100 |

[1]High functionality capped polyether polyol of high molecular weight, functionality, and primary hydroxyl content with a base polyol molecular weight of about 5500, available from Dow Chemical Company, Midland, MI.
[2]Grafted polyether polyol containing copolymerized styrene and acrylonitrile, base polyol molecular weight about 4800, available from Dow Chemical Company, Midland, MI.
[3]Silicone surfactant is available from Air Products and Chemicals, Inc.
[4]The amine catalyst is available from Air Products and Chemicals, Inc.

TABLE 10

TDI Foam Kinetic Data for Various Catalyst Combinations

| Foam | Gelling Catalyst | Gelling Catalyst (pphp) | Blow Catalyst | Blow Catalyst (pphp) | EXT[2] (sec) | SGT[2] (sec) |
|---|---|---|---|---|---|---|
| 12 | Dabco ®NE1070 | 0.70 | Dabco ®NE300 | 0.17 | 43 | 59 |
| 13 | $K_2SO_3$[1] | 0.20 | Dabco ®NE300 | 0.22 | 47 | 59 |
| 14 | $K_2SO_3$ | 0.30 | Dabco ®NE300 | 0.17 | 49 | 59 |
| 15 | $K_2SO_3$ | 0.20 | Dabco ®NE300 | 0.27 | 44 | 54 |

[1]Potassium sulfite was deliverd in the formulation as a 20% solution in water.
[2]EXT is the time in seconds it takes the foaming mass to extrude from a mold isothermally controlled, heated aluminum mold maintained at 70 ± 2° C.
The mold was a typical physical property tool designed with internal dimensions of 40.6 cm × 40.6 cm × 10.2 cm.
The mold has five vents, each approximately 1.5 mm in diameter, centered in each corner 10.0 cm from each edge and the geometric center of the lid.
The string gel time (SGT) is the time in seconds at which the polymerizing mass is able to form polymer strings when touched with a wooden tongue suppressor once the foam has extruded through one of the orifices of the mold.

Table 11 shows some representative physical properties of flexible molded foam foam pads for the $K_2SO_3$/Dabco®NE300catalyst combination and its comparison with a standard amine base catalyst combination.

TABLE 11

Physical Properties of HR TDI Based Flexible Foam

| Property | Unit | Method | Foam 12 (std) | Foam 13 | Foam 14 | Foam 15 |
|---|---|---|---|---|---|---|
| Density | Kg/m3 | ASTM D3574-A | 43 | 43 | 44 | 43 |
| Air Flow | SCFM | ASTM D3574-G | 3.8 | 3.3 | 3.4 | 3.1 |
| ILD 25% | N | ASTM D3574-B1 | 183 | 171 | 148 | 161 |
| ILD 65% | N | ASTM D3574-B1 | 475 | 453 | 427 | 443 |
| ILD 25% (Return) | N | ASTM D3574-B1 | 153 | 133 | 110 | 126 |
| Support Factor | Ratio | ASTM D3574-B1 | 2.6 | 2.6 | 2.8 | 2.7 |
| Resilience | % | ASTM D3574-H | 58 | 61 | 60 | 59 |
| Tensile Strenght | kPa | DIN 53571 | 141 | 114 | 121 | 119 |
| Tensile Elongation | % | DIN 53571 | 99 | 96 | 101 | 97 |
| Tear Strength | N/m | ASTM D3574-F | 288 | 277 | 269 | 270 |

The invention claimed is:

1. A process for producing polyurethane consisting of contacting at least one polyester polyol and at least one isocyanate while in the presence of A) a catalyst consisting of at least one sulfite, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite consists of at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N-CH_2-C_6H_5)_2SO_3$], cetyltrimethylammonium sulfite [$(Me_3N-(CH_2)_{14}-CH_3)_2SO_3$], N-methyl-pyridinium sulfite [$(Me-C_5NH_5)_2SO_3$], and dialkylimidazolium sulfite salts [$(R_2C_3N_2H_3)_2SO_3$], and wherein the amount of the at least one sulfite is about 0.1 to about 20 parts by weight per hundred parts by weight of the at least one polyol.

2. A process for producing polyurethane consisting of contacting at least one polyester polyol and at least one isocyanate while in the presence of A) a gelling catalyst consisting of at least one sulfite and at least one blowing catalyst selected from the group consisting of 2-[N-(dimethylaminoethoxyethyl)-N-methylamino]ethanol, N,N,N'-trimethyl-N'-3-aminopropyl-bis(aminoethyl) ether, bis(dimethylaminoethyl)ether, pentamethyldiethylene triamine, and hexamethyltriethylenetetraamine, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of:
i) $M_2SO_3$ where M is an alkali metal selected from the group of Na, K, Li, Cs, ii) $MSO_3$ where M is an alkali earth metal selected from the group of Ca, Mg, Sr, Ba; and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups, and wherein the amount of the at least one sulfite is about 0.1 to about 20 parts by weight per hundred parts by weight of the at least one polyol.

3. A process for producing polyurethane consisting of contacting at least one polyester polyol and at least one isocyanate while in the presence of A) a catalyst composition consisting of i) a gelling catalyst consisting of at least one sulfite and ii) at least one tetralkylammonium phase transfer catalyst selected from the group consisting of carboxylates, sulfonates, halide ions, and sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, and N-methyltriethylenediammonium, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of: i) $M_2SO_3$ where M is an alkali metal selected from the group of Na, K, Li, Cs, ii) $M_2SO_3$ where M is an alkali earth metal selected from the group of Ca, Mg, Sr, Ba; and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups, and wherein the amount of the at least one sulfite is about 0.1 to about 20 parts by weight per hundred parts by weight of the at least one polyol.

4. A process for producing polyurethane consisting of contacting at least one polyester polyol and at least one isocyanate while in the presence of A) a catalyst composition consisting of i) a gelling catalyst consisting of at least one sulfite, ii) at least one blowing catalyst, and iii) at least one tetralkylammonium phase transfer catalyst, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of: i) $M_2SO_3$ where M is an alkali metal selected from the group of Na, K, Li, Cs, ii) $M_2SO_3$ where M is an alkali earth metal selected from the group of Ca, Mg, Sr, Ba; and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups; wherein the at least one blowing catalyst is selected from the group consisting of 2-[N-(dimethylaminoethoxyethyl)-N-methylamino]ethanol, N,N,N'-trimethyl-N'-3-aminopropyl-bis(aminoethyl) ether, bis (dimethylaminoethyl)ether, pentamethyldiethylene triamine, and hexamethyltriethylenetetraamine; wherein the at least one tetralkylammonium phase transfer catalyst is selected from the group consisting of carboxylates, sulfonates, halide ions, and sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, and N-methyltriethylenediammonium; and wherein the amount of the at least one sulfite is about 0.1 to about 20 parts by weight per hundred parts by weight of the at least one polyol.

\* \* \* \* \*